US 8,358,602 B2

(12) United States Patent
Puthiyandyil et al.

(10) Patent No.: US 8,358,602 B2
(45) Date of Patent: Jan. 22, 2013

(54) METHOD AND SYSTEM FOR SUPPORTING PACKET DATA NETWORK COMMUNICATIONS

(75) Inventors: Sanil Kumar Puthiyandyil, Nashua, NH (US); Rajesh Velandy, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 697 days.

(21) Appl. No.: 12/493,661

(22) Filed: Jun. 29, 2009

(65) Prior Publication Data

US 2010/0027448 A1 Feb. 4, 2010

Related U.S. Application Data

(60) Provisional application No. 61/076,552, filed on Jun. 27, 2008.

(51) Int. Cl.
*H04B 7/00* (2006.01)
*H04W 4/00* (2009.01)
*H04J 3/00* (2006.01)

(52) U.S. Cl. .......................... 370/310; 370/328; 370/464

(58) Field of Classification Search .......... 370/277–278, 370/282, 310, 310.2, 328, 338, 395.2, 464, 370/465
See application file for complete search history.

(56) References Cited

U.S. PATENT DOCUMENTS

| 7,154,868 | B1 | 12/2006 | Sharma et al. | |
|---|---|---|---|---|
| 8,160,038 | B1* | 4/2012 | Zhao et al. | 370/338 |
| 8,161,132 | B1* | 4/2012 | Zhao et al. | 709/218 |
| 8,243,686 | B2* | 8/2012 | Bhalla et al. | 370/331 |
| 2004/0062254 | A1* | 4/2004 | Kuzhiyil et al. | 370/401 |
| 2005/0083899 | A1* | 4/2005 | Babbar et al. | 370/342 |
| 2005/0163069 | A1* | 7/2005 | Xu et al. | 370/328 |
| 2006/0050696 | A1 | 3/2006 | Shah et al. | |
| 2006/0251058 | A1 | 11/2006 | Xu et al. | |
| 2007/0195804 | A1 | 8/2007 | Ijima et al. | |
| 2007/0201469 | A1 | 8/2007 | Iyer et al. | |
| 2008/0259873 | A1* | 10/2008 | Ahmavaara et al. | 370/331 |
| 2009/0290540 | A1* | 11/2009 | Cherian et al. | 370/328 |
| 2010/0322163 | A1* | 12/2010 | Bhalla et al. | 370/329 |
| 2011/0199987 | A1* | 8/2011 | Rommer et al. | 370/329 |

OTHER PUBLICATIONS

International Search Report and Written Opinion issued for corresponding International Patent Application No. PCT/US2009/049050 mailed Sep. 1, 2009.
Simpson, W., "The Point-to-Point Protocol (PPP)," Network Working Group, Jul. 1994.
Carlson, J. et al., "Point-to-Point Protocol (PPP) Vendor Protocol," Network Working Group, May 2004.
Bhalla, Rajesh et al. "eHRPD Rev A PDN Connection ID discussion." 23 pages. Date believed to be 2010 (document X50 20100125 016 ZTE).

* cited by examiner

*Primary Examiner* — Warner Wong
(74) *Attorney, Agent, or Firm* — Wilmer Cutler Pickering Hale and Dorr LLP

(57) ABSTRACT

Methods and systems for providing network connectivity in wireless networks are provided. This network connectivity can involve a mobile node being able to connect with more than one network at the same time and supporting multiple protocol sessions. Additionally, modifications can be made to allow a mobile node to have multiple IP addresses. These modifications include using a packet data network identifier along with a network control protocol to allow a network device to provide to user equipment (UE) multiple packet data network connections. The network device can be a access gateway or HPRD serving gateway (HSGW) that sets up the PDN connections for the UE. The packet data network identifier can be used to distinguish between multiple PDN connections for a UE.

18 Claims, 10 Drawing Sheets

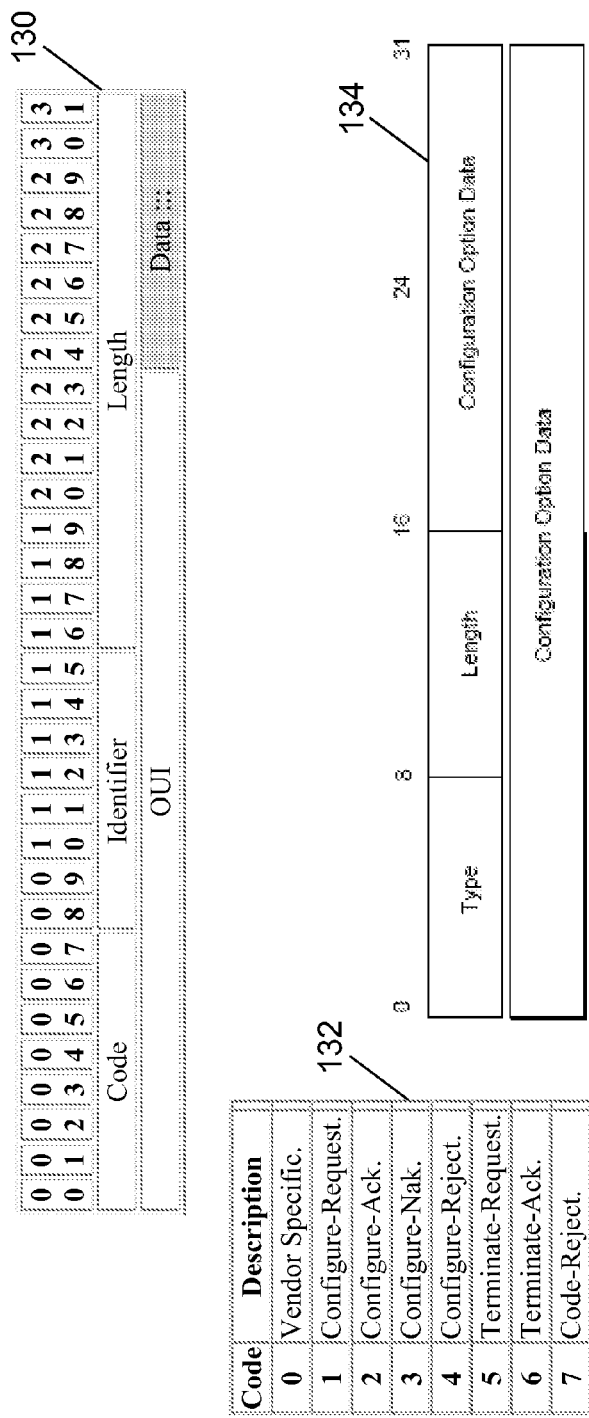
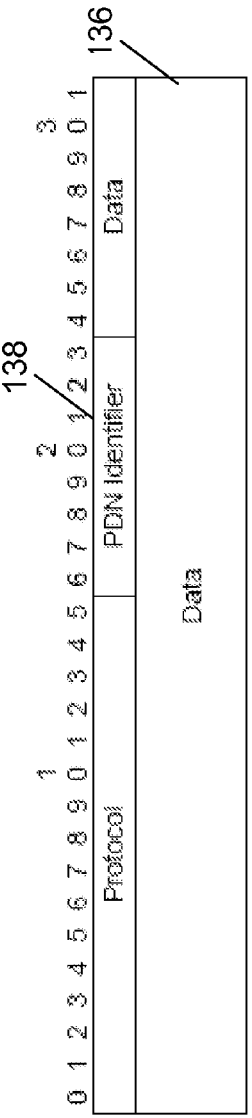
FIG. 2A
FIG. 2B

METHOD AND SYSTEM FOR SUPPORTING PACKET DATA NETWORK COMMUNICATIONS

CROSS REFERENCE TO RELATED APPLICATIONS

This application claims the benefit under 35 U.S.C. §119 (e) of U.S. Provisional Application Ser. No. 61/076,552 entitled "Method and System for Supporting enhanced High Rate Packet Data" filed on Jun. 27, 2008, which is hereby incorporated by reference herein in its entirety.

FIELD OF THE DISCLOSURE

This application relates to the field of telecommunications, and more particularly to a mobile device communicating with multiple packet data networks.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

The first generation of wireless telephone technology used analog mobile phones in which analog information signals were transmitted. As technology progressed a second generation (2G) of wireless service was introduced. In 2G systems, digital information signals were used to modulate a carrier. These 2G technologies used time division multiplexed access (TDMA) or code division multiple access (CDMA) technologies to distinguish multiple users. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed the GSM/UMTS/HSDPA and cdmaOne/CDMA2000/EV-DO technologies. The next evolution is 4G technology, which is referred to as long term evolution-system architecture evolution (LTE-SAE) and uses orthogonal frequency division multiple access (OFDMA) technology.

Other wireless protocols have also been developed including WiFi, an implementation of various IEEE 802.11 wireless local area network protocols, WiMAX, an implementation of IEEE 802.16, and HiperMAN, which is based on an ETSI alternative to IEEE 802.16.

Wireless communication technologies are used in connection with many applications, including, for example, satellite communications systems, portable digital assistants (PDAs), laptop computers, and mobile devices (e.g., cellular telephones, user equipment). One benefit that users of such applications can obtain is the ability to connect to a network (e.g., the Internet) as long as the user is within range of such a wireless communication technology.

SUMMARY OF THE DISCLOSURE

In embodiments of the topology described herein, more than one IP address can be used with user equipment. An IP address is allocated to a packet data network (PDN) connection. The IP address can be associated with or assigned by the PDN gateway. More than one IP address can be assigned during a PDN session, which can be a network connection with a packet gateway where communication is occurring. For example, a UE can establish a PDN session with a first PDN gateway and later establish a second PDN session with a second PDN gateway. In some embodiments, a PDN identifier is used at the high speed packet data serving gateway to track and direct messages from a UE 110 to PDN gateways. The identifier allows separate PDN sessions to be created in a serving gateway to allow connections to multiple networks, and for the UE to have one or more IP addresses. In certain embodiments, a first application running on the UE can use a first PDN-ID and a second application running on the UE can use a second PDN-ID, where the UE can set up a new PDN session for an applications that request a PDN session or where a new PDN session makes sense. The PDN-ID can also allow the UE to connect to multiple APNs that are running on one or more packet gateways In one embodiment, a method of communicating with multiple gateways includes receiving a first point to point protocol (PPP) configuration request message including a first packet data network ID (PDN-ID) and access point name (APN) information at a serving gateway; setting up a connection from the serving gateway to a first packet data network gateway (PGW); sending a first PPP configuration acknowledgement message including a first PDN-ID; creating a new instance in the PPP with the first PDN-ID; receiving a second PPP configuration request message including a second PDN-ID at the serving gateway; setting up a second PDN session; and creating a new instance in the PPP with the second PDN-ID.

The embodiments also include a serving gateway in a communication network comprising: a first interface which is configured to receive a first network configuration protocol (NCP) configuration request message including a first packet data network ID (PDN-ID) and a second PPP configuration request message including a second PDN-ID; the serving gateway configured to establish a first PDN connection that is associated with the first PDN-ID with a first packet data network gateway (PGW) and second PDN connection that is associated with the second PDN-ID; a computer readable medium that stores a first NCP instance created for the first PDN connection and a second NCP instance created for the second PDN-ID.

In still other embodiments, the system includes a method that can be used by user equipment including sending a first network control protocol (NCP) configuration request message including a first packet data network ID (PDN-ID) and address information to a serving gateway to setup a first packet date network (PDN) session connection; receiving a first NCP configuration acknowledgement message including a first PDN-ID; establishing the first PDN session connection with the first PDN-ID; sending a second NCP configuration request message including a second PDN-ID to the serving gateway to setup a second PDN session connection; and establishing the second PDN session with second PDN-ID.

Other features and advantages will become apparent from the following description, drawings, and claims.

BRIEF DESCRIPTION OF THE DRAWINGS

FIGS. 2A and 2B illustrate formatting of packet headers in accordance with certain embodiments;

DETAILED DESCRIPTION OF THE DISCLOSURE

Methods and systems for providing network connectivity in wireless networks are provided. This network connectivity can involve a mobile node being able to connect with more than one network at the same time and supporting multiple protocol sessions. Additionally, modifications can be made to allow a mobile node to have multiple IP addresses. The multiple IP addresses can be related to different home networks, which may serve as anchor points for data in the network. Thus, the mobile node can have multiple home addresses where separate data streams are passed through separate home networks. This can occur, for example, if a mobile node or user equipment (UE) is connected to an enterprise home network, a home network for internet content, and another home network for Voice over IP (VoIP) service.

Figure 1:
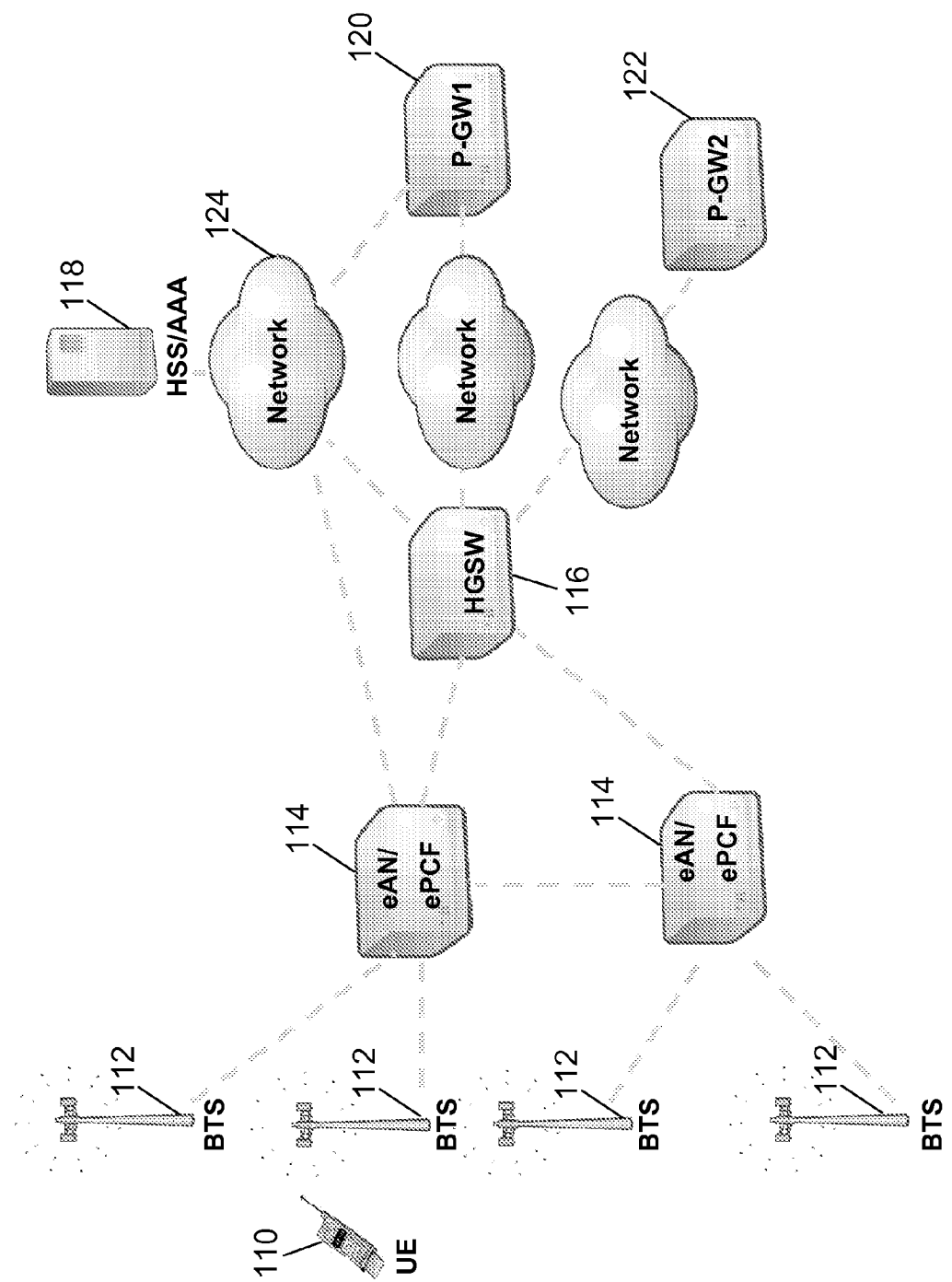
FIG. 1 illustrates a functional diagram of a network topology in accordance with certain embodiments.

FIG. 1 illustrates a functional diagram of a network topology in accordance with some embodiments. The network topology supports evolved High Rate Packet Data (eHRPD), which uses elements of the 4G or SAE/EPC architecture and is based on evolution-data only (EV-DO). The user equipment (UE) 110 can be a mobile phone, a personal digital assistant (PDA), a wireless enabled computer, or any other suitable wireless device. The UE 110 communicates with the core network using radio waves over an air interface to high rate packet data base transceiver station (HRPD BTS) 112. The HRPD BTSs 112 provide transceiver functionality to the user equipment 110 and are controlled by a evolved Access Networks (eAN)/evolved Packet Control Function (eAN/ePCF) 114. The eAN/ePCFs 114 can control the conversion between the air interface and the access network. The eAN/ePCFs 114 includes a logical entity in the Radio Access Network (RAN) used for radio communications with the UE and an evolved Packet Control Function entity (ePCF) that manages the relay of packets between the eAN and a HRPD serving gateway (HSGW) 116. The HSGW 116 provides functionality that is similar to what a packet data serving node (PDSN) would provide in a CDMA network topology. The HSGW can provide converged mobility management between HRPD and LTE networks. The HSGW provides interworking between the HRPD access node and the Packet Data Network Gateway (P-GW), an element of the SAE/EPC network. In some embodiments, the existing PDSN can be integrated with or upgraded to the HSGW while the existing home agent (HA) can be integrated with or upgraded to the P-GW (or provided as a separate node).

The functionality of the HSGW includes providing a connection point between the radio access network and the IP network, providing mobility management functions, and providing packet routing functionality. The home subscriber server (HSS)/authentication, authorization, and accounting server (AAA) 118 handles requests for access to the network resources and provides authentication, authorization, and accounting services for the network provider. The HSS/AAA server 118 typically also interacts with the HSGW 116 to provide information regarding the user equipment or the address of the home network. Network 124, which couples the HGSW to other devices in the communication network, can be an internet protocol based network composed of routers and other telecommunications equipment. The PDN gateway (P-GW) is a network device that acts as an anchor point for communications to the UE. FIG. 1 illustrates a first P-GW1 120 and a second P-GW2 122 as two P-GWs in communication with a HSGW 116. The network can reach the UE as the UE moves in the network through the P-GW, which tunnels packet data to the UE. The P-GW maintains information about the UE's current location, which can be identified by a home address.

When a UE connects to the access network, the UE associates with a P-GW. The P-GW then provides data forwarding to the UE as the UE roams on the network. In some embodiments, the UE 110 can connect to multiple PDN gateways (P-GWs), for example, P-GW1 120 and P-GW2 122. This can be desirable if, for example, the UE is connecting to an enterprise network and also using the internet on the service provider's network. The UE 110 can also connect to multiple networks using the same P-GW, e.g., P-GW1 120, with a separate packet data network (PDN) connection for each network. A PDN connection can be the association between a UE represented by an IP address (IPv4, IPv6, or both IPv4 and IPv6) and a PDN represented by an APN (access point name). The APN provides and defines a service in the PDN connection, such as an internet connection, a bearer service for delivery of short message service (SMS) messages, or voice over IP (VoIP) service. Each PDN connection can be to an APN on the P-GW, and in some embodiments a UE can connect with multiple APNs.

The known and implemented pre-4G technologies do not have a way to deal with a UE setting up more than one PDN connection or connecting to more than one P-GW. Typically, during setup in a known pre-4G network, one IPv4 or IPv6 address is negotiated.

In the topology described herein, more than one IP address can be used with the UE 110. An IP address is allocated to the PDN connection with the IP address being an IPv4, IPv6, or both IPv4 and IPv6 (IPv4v6) address. The IP address can be associated with or assigned by the P-GW. Further, more than one IP address can be assigned during a PDN session. A PDN session can be a network connection with a P-GW where communication is occurring. For example, UE 110 can establish a PDN session with P-GW1 120 and later establish a second PDN session with P-GW2 122. In some embodiments, a PDN identifier is used at the HSGW to track and direct messages from UE 110 to P-GW1 120 and P-GW2 122. The identifier allows separate PDN sessions to be created in a serving gateway to allow connections to multiple networks, and for the UE to have one or more IP addresses. In certain embodiments, a first application running on the UE can use a first PDN-ID and a second application running on the UE can use a second PDN-ID, where the UE can setup a new PDN session for an applications that request a PDN session or where a new PDN session makes sense. The PDN-ID can also allow the UE to connect to multiple APNs that are running on one or more P-GWs.

In order to provide the ability to have more than one IP address or more than one P-GW, an identifier is used with each UE. This identifier can be used to distinguish among the PDN connections between the UE and the HSGW and in routing the packet data to the APN on the P-GW associated with the PDN connection. In some embodiments, the PDN setup is a network layer setup and a point-to-point protocol (PPP) network control protocol (NCP) is used for the PDN setup. The PPP NCP can be used to add an identifier. The identifier can be a PDN-ID, which may be a Vendor-Specific Network Control Protocol (VSNCP) identifier, and each unique identifier or PDN-ID is associated with a specific P-GW in some embodiments. Each PDN-ID is used to create a separate instance in the PPP. Each separate NCP instance can include a PPP state machine, which allows for a separate PDN connection, and can be VSNCP instance. In other NCPs, such as IPCP, the protocol does not allow for assignment of multiple IP addresses or for multiple state machines. The HSGW can then manage multiple instances in the PPP per UE based on the PDN-ID. When a new PDN-ID arrives at the HSGW, the HSGW can create a new instance in the PPP. The PDN-ID is used in all VSNCP packets in some embodiments. The PDN-ID can be used for default and other types of PDN connections.

In some embodiments, Vendor-Specific protocols are used to set up one or more PDN sessions. The Vendor-Specific Protocols can include the Vendor-Specific Network Control Protocol (VSNCP), the Vendor-Specific Protocol (VSP), the Vendor-Specific Network Protocol (VSNP), and the Vendor-Specific Authentication Protocol (VSAP). The VSNCP can be used to establish the PDN connection and to create multiple VSNCP instances in the PPP, in certain embodiments.

A VSNCP header, in accordance with some embodiments, is shown in FIG. 2A as header 130. The header 130 includes an 8 bit code section that specifies the function to be performed. A table 132 in FIG. 2A shows various functions allowed. The code section can be used to set up the PDN session. The header 130 further includes an identifier section, which can be 8 bits and be used to place a PDN-ID. The PDN-ID can also be placed in the data section of header 130 as one or more configuration options, with a format shown in configuration option data format 134. These configuration options can include a PDN-ID, an APN, a PDN type (IPv4, IPv6, and IPv4v6), PDN address, protocol configuration options (PCO), error code, attach type (e.g., initial attach and handover attach), address allocation cause, IPv4 default router address (e.g., a default IP address for the PDN), and a APN-AMBR (APN aggregate maximum bit rate). The PDN-ID can be a number which is used to identify one PDN session from other PDN sessions. In certain embodiments, a control PDN-ID can be designated from among the identifiers to indicate that the messaging is for control messaging and is not related to any specific instance or PDN session. The length section can specify the length of the header including the data section. The OUI can be an unique identifier that identifies the vendor or other information regarding the packet. The data section is a variable length section.

FIG. 2B illustrates a VSNP header in accordance with certain embodiments. The VSNP header 136 can be used for sending data packets for a PDN session. The VSNP header 136 can be used to encapsulate PPP HDLC framing for a PDN session in certain embodiments. The PDN-ID 138 can be used to identifer the user data for a particular PDN connection.

Figure 3:
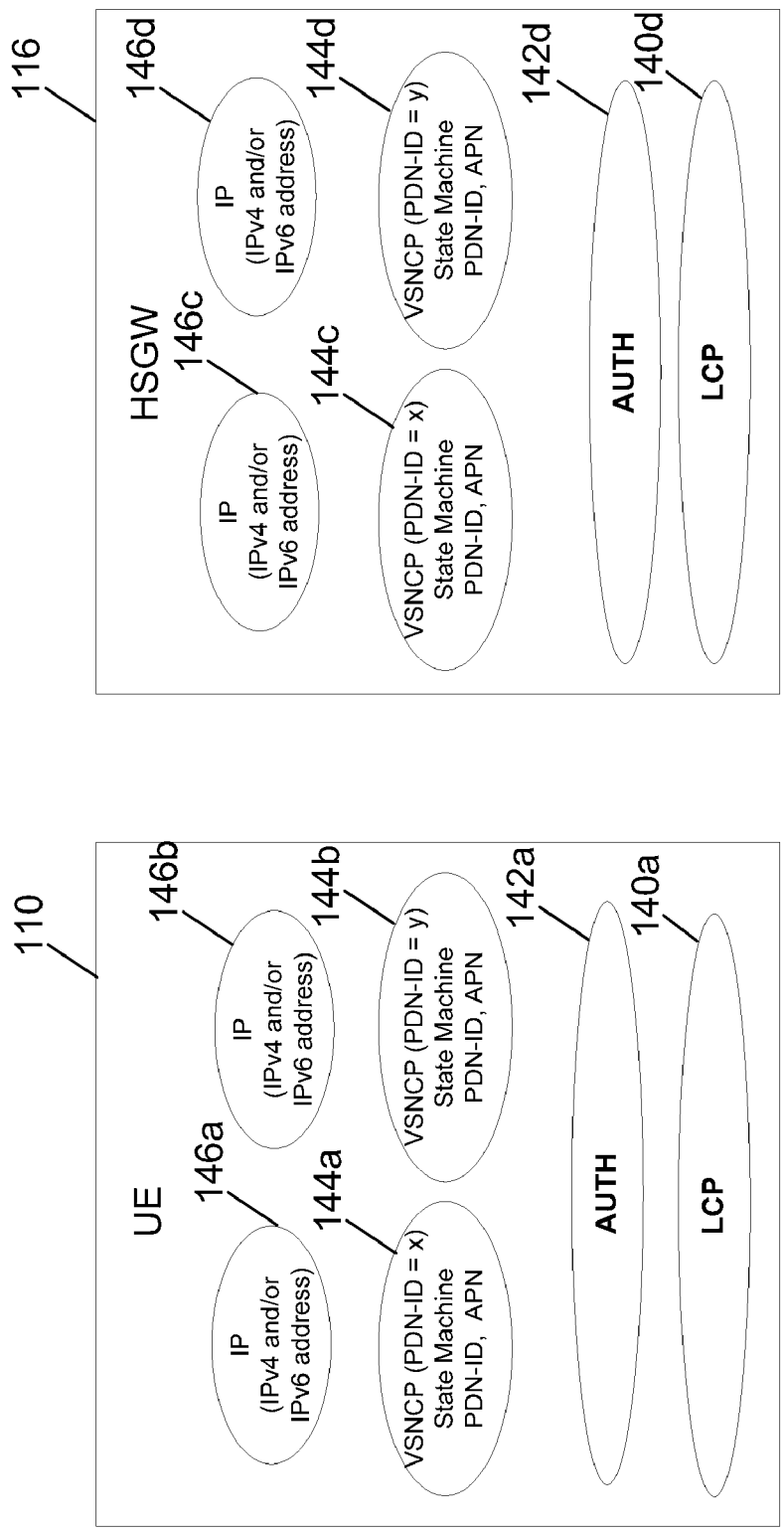
FIG. 3 illustrates a logical diagram of software used in network communications in accordance with certain embodiments.

FIG. 3 illustrates a logical diagram of software used in network communication in accordance with certain embodiments. FIG. 3 includes a UE 110 and HSGW 116 which are in communication with one another. The UE 110 and HSGW 116 have established link control protocol (LCP) 140a and 140d. The LCP establishes a link between the UE and the HSGW and forms part of the PPP. On top of the LCP, an authentication layer (Auth) 142a and 142d such as extensible authentication protocol for authentication and key agreement (EAP-AKA) is provided for authentication and security. The EAP provides some common functions and a negotiation of the desired authentication mechanism. Various authentication methods can be used such as lightweight extensible authentication protocol (LEAP), generic token card (GTC), transport layer security (TLS), internet key exchange (IKEv2), and AKA. The LCP along with Auth 142a, 142d provides an authenticated link, on top of which NCP instances can exist such as 144a, 144b, 144c, and 144d. These NCP instances can be VSNCP instances including a state machine that is part of the PPP state machine. The state machine of each instance 144n can track the state transitions of one PDN session separately from another PDN session. For example, the paired instances of 144a and 144c, as well as 144b and 144d, can allow for two separate PDN connections on UE 110. As shown, instance 144a has a PDN-ID=x, which can be any applicable identifier and instance 144b has a PDN-ID=y. The ability to create multiple instances can allow for multiple PDN connections that rely on the state machine as well as the information associated with an instance to maintain communication over the connection. After an instance is established, an IP module including an IP address can be provided for use in the PDN connection with, for example, the IP module 146a corresponding with the instance 144a. The IP address can be used to identify UE 110 and be the address used by the network to send packets to UE 110. The instance can be setup as described in the signaling flow below.

Figure 4:
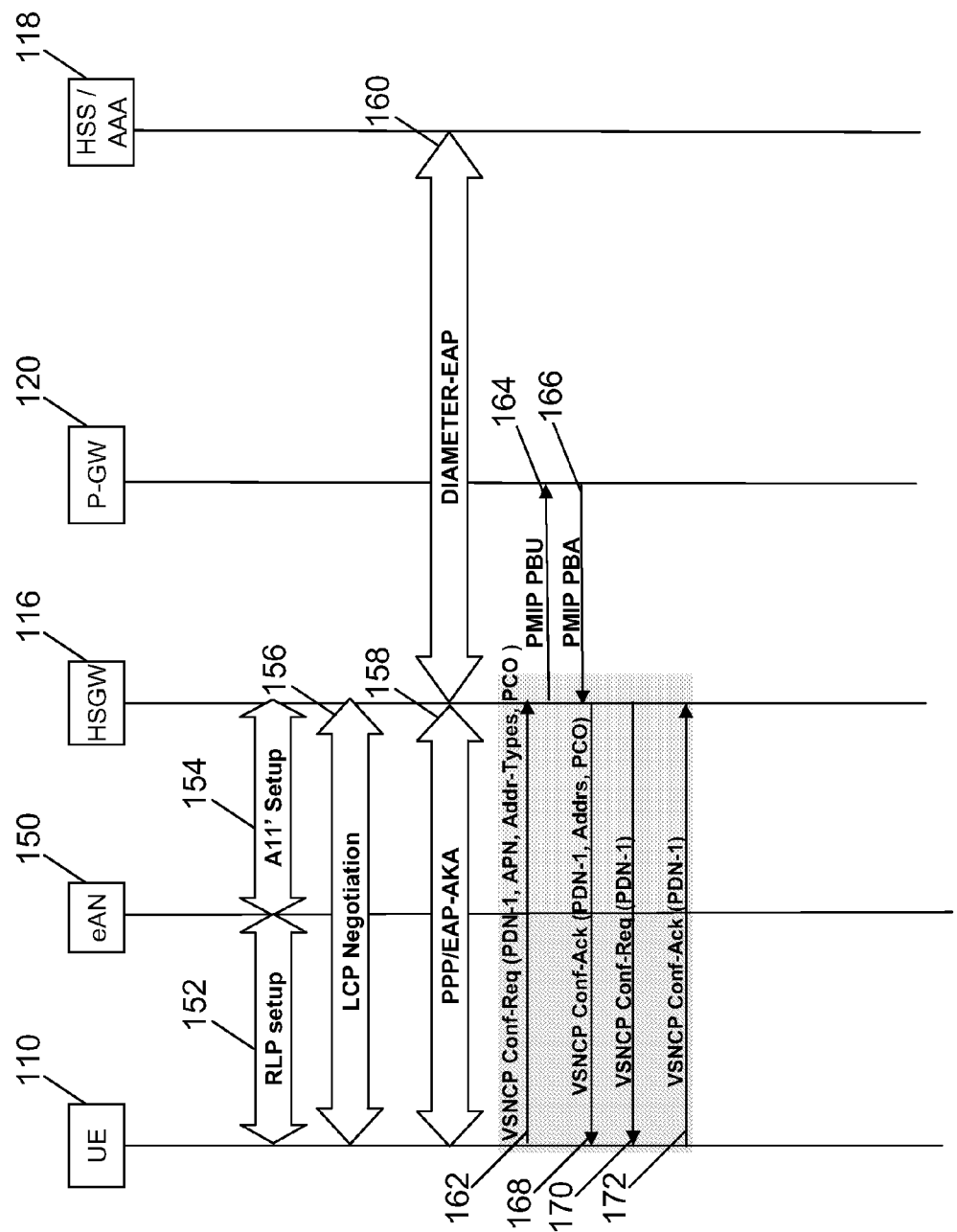
FIG. 4 illustrates a signaling flow for a PDN setup in accordance with certain embodiments.

FIG. 4 illustrates a signaling flow for a PDN setup in accordance with some embodiments. The signaling communication occurs between user equipment (UE) 110, an evolved access network/evolved packet control function (eAN/ePCF) 150, an HPRD serving gateway (HSGW) 116, a PDN gateway (P-GW) 120, and a home subscriber server (HSS)/authentication, authorization, and accounting server (AAA) 118. In FIG. 4, radio link protocol (RLP) setup 152 occurs between the UE 110 and the eAN 150. An A11 interface setup 154 occurs between the eAN 150 and the HSGW 116. After RLP and A11 setup, link control protocol (LCP) 156 between the UE 110 and the HSGW 116 can begin. The LCP can be used to set up a link and allows PPP setup 158 to occur between the UE 110 and the HSGW 116. In addition, in setup 158, extensible authentication protocol (EAP) for UMTS authentication and key agreement (AKA) can provide a mechanism for authentication and session key distribution using an UMTS subscriber identity module (USIM). When the HSGW 116 receives the information regarding the UE 110, the information can be verified with the HSS/AAA using the diameter-EAP protocol 160.

A PDN session is setup using VSNCP signaling between the UE 110 and the HSGW 116. A VSNCP conf-req message 162 is sent including a PDN-ID (i.e., PDN-1), an access point name (APN), addr-types, and a protocol configuration option (PCO). The APN can be used to obtain access point information from the HSS/AAA in some embodiments. The PDN-ID can be used as an index to identify a PDN connection, while the APN is used to obtain addressing and other information to locate and connect to the P-GW. The information obtained from the HSS/AAA can be cached at the HSGW. The addr-types is used for indicating IP address version capability and the PCO can provide protocol specific information between the UE and the P-GW. The PCO can be used to transparently communicate to the P-GW through the HSGW for such things as DNS address, for example. The HSGW 116, upon receiving this information, contacts the P-GW 120 with a proxy mobile internet protocol (PMIP) proxy binding update (PBU) 164. The PMIP can be PMIPv6 and its use in this topology is further described in U.S. patent application Ser. No. 12/330,195, which is hereby incorporated by reference in its entirety. This is used to set up a connection to the P-GW 120. If the setup is successful at the P-GW 120, a PMIP proxy binding acknowledgement (PBA) 166 is sent from the P-GW with an assigned IP address to the HSGW. The HSGW sends the UE a VSNCP conf-ack 168 with the PDN-ID (i.e., PDN-1), the address information (addrs), and a PCO. A conf-req 170 sent from the HSGW to the UE with the PDN-ID can be used to satisfy the negotiation requirement of the PPP NCP protocol. The UE sends a conf-ack 172 back to the HSGW with the PDN-ID to complete VSNCP setup messaging.

The NCP negotiation is optimized in some embodiments to reduce the setup signaling. For example, a conf-ack is used instead of a conf-nak if the response is positive in the setup signaling. This is shown in FIG. 4. If the response is negative, then a conf-rej is sent. A conf-req with the PDN-ID is used to satisfy the PPP NCP negotiation requirement. These optimizations can reduce the PDN connection signaling to 4 messages. In some embodiments, more messages can be used. For example a conf-nak can be used for a positive response. When a PDN connection is to be terminated, a NCP term-req message is used to indicate that the PDN connection is ready for termination. The PDN connection can be updated by sending a configuration request message with the same PDN-ID as the original and with any parameters that are to be updated. When the new parameters are received, the new parameters overwrite the old parameters. In some embodiments, method parameter negotiation, retransmission, session establishment, and termination can be implemented using the techniques described in PPP RFC 1661 for NCP, which is incorporated by reference herein in its entirety.

The HSGW upon receiving a message with an access point name or access point identifier and a PDN-ID can use the PDN-ID as an index in a cache and retrieve information relating to the P-GW from the HSS/AAA. Upon receiving the information from the HSS/AAA, this information can be stored in a cache or other computer readable medium in communication with the processors of the HSGW to provide information to generate a message to send to the P-GW to setup a session and open a connection. Additional packets can include the PDN-ID to allow for routing, or the P-GW addressing information can be used without the use of a PDN-ID. The PDN-ID is used in setting up a second PDN session with another P-GW. The HSGW upon receiving a message with a second APN or access point identifier and a second PDN-ID can create a new PDN session with the second PDN-ID and setup a connection with the new P-GW. The PDN-ID allows tracking of the various PPP instances and PDN sessions so that configuration changes are directed to the correct PDN session. Certain embodiments allow for the use of a PDN-ID in conjunction with VSNCP to provide the network and/or the HSGW with the ability to provide more than one P-GW per UE and/or more than one IP address per UE. The IP addresses can be IPv4 addresses or IPv6 addresses and allocated using DHCP or router solicitation and router advertisement.

Figure 5:
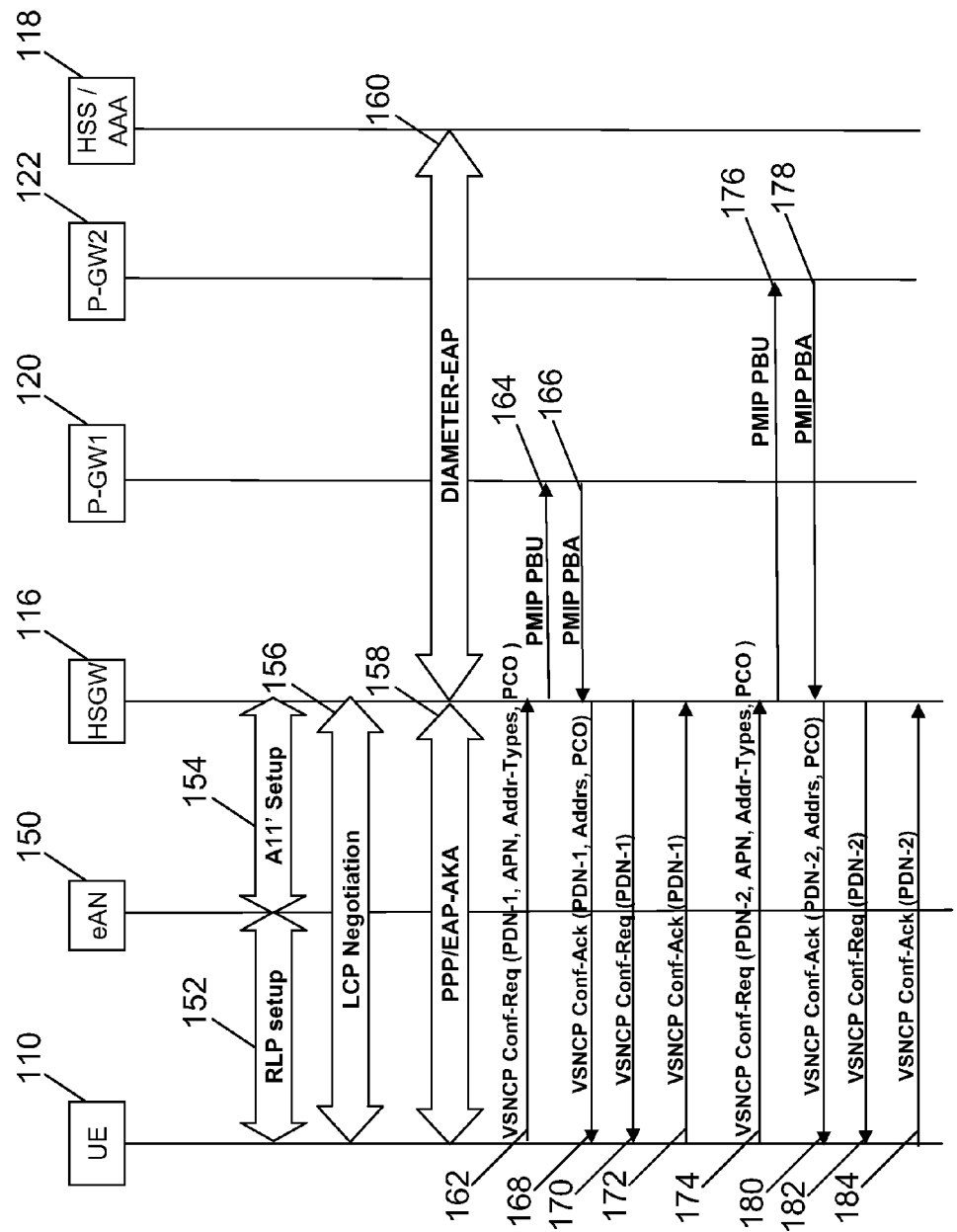
FIG. 5 illustrates signaling with two PDN gateways in accordance with certain embodiments.

FIG. 5 illustrates signaling with two PDN gateways in accordance with certain embodiments. As shown, a UE 110 can initiate a first PDN session with P-GW1 120. Then while the PDN session with P-GW1 120 is still active, UE 110 can initiate a second PDN session with P-GW2 122. The initiation of the first PDN session is more fully described in relation to FIG. 4. After a configuration request message 162 is sent, proxy Mobile IP (PMIP) messaging 164 and 166 is exchanged with P-GW1, and configuration ack message 168 is sent back to UE 110, the UE can initiate a second PDN session. The second PDN session can be initiated by sending a conf-req message 174, which can include a PDN-ID (i.e., PDN-2), an access point name (APN), addr-types, and a protocol configuration option (PCO). The HSGW 116 upon receiving this information contacts the P-GW2 122 with a proxy mobile internet protocol (PMIP) proxy binding update (PBU) 176. This is used to setup a connection to the P-GW2 122. If the setup is successful at the P-GW2 122, a PMIP proxy binding acknowledgement (PBA) 178 is sent from the P-GW2 to the HSGW 116. The HSGW 116 sends the UE 110 a configuration acknowledgement message 180 with the PDN-ID (i.e., PDN-2), the address information (addrs), and a PCO. A configuration request message 182 from the HSGW 116 to the UE 110 can be used to satisfy the negotiation requirement of the PPP NCP protocol. This message includes the PDN-ID. The UE 110 sends a configuration acknowledgement message 184 back to the HSGW 116 with the PDN-ID. After the configuration messages are exchanged, the UE 110 can be connected with two P-GWs (120 and 122) at the same time. The PDN-IDs correspond and identify the PDN session for the HSGW.

As described in FIGS. 4 and 5, the UE initiates the process to setup a PDN session and sends a configuration request message to the network. In some embodiments, the network initiates the process to setup a PDN session, and can include devices such as the HSGW, the P-GW, a gateway, or a server, for example. The network can initiate a PDN session by sending a configuration message to the UE with a specified PDN-ID that causes the UE to pick a PDN-ID for use in a new session. The specified PDN-ID can be chosen to be outside the range of PDN-IDs selected by the UE for PDN session identification. In other embodiments, a network control protocol message is sent to the UE requesting a new PDN session be set up. Upon receiving the network control protocol message, the UE sends a configuration request message with a PDN-ID for a new PDN session. The HSGW receives the configuration message with the PDN-ID and can proceed as is described in FIGS. 4 and 5.

Once a PDN connection is established, the UE or the network may establish additional dedicated bearers for the PDN. These additional bearers provide the necessary quality of service (QoS) for certain applications like, for example, VoIP and video streaming. In case of UE-initiated QoS, the UE sends an RSVP message including profile-id and traffic flow template to the HSGW to authorize and establish Qos flows. In case of network initiated QoS, the HSGW sends the traffic flow template and profile-id to the UE in an RSVP message. The HSGW can use local provisioning or policy and charging rules function (PCRF) installed QoS rules to trigger network initiated QoS. The UE establishes the additional bearers to carry the QoS traffic. The UE can use the traffic flow template to classify uplink traffic into the appropriate bearers and the HSGW can use the traffic flow template to classify the downlink traffic into appropriate bearers.

Figure 6:
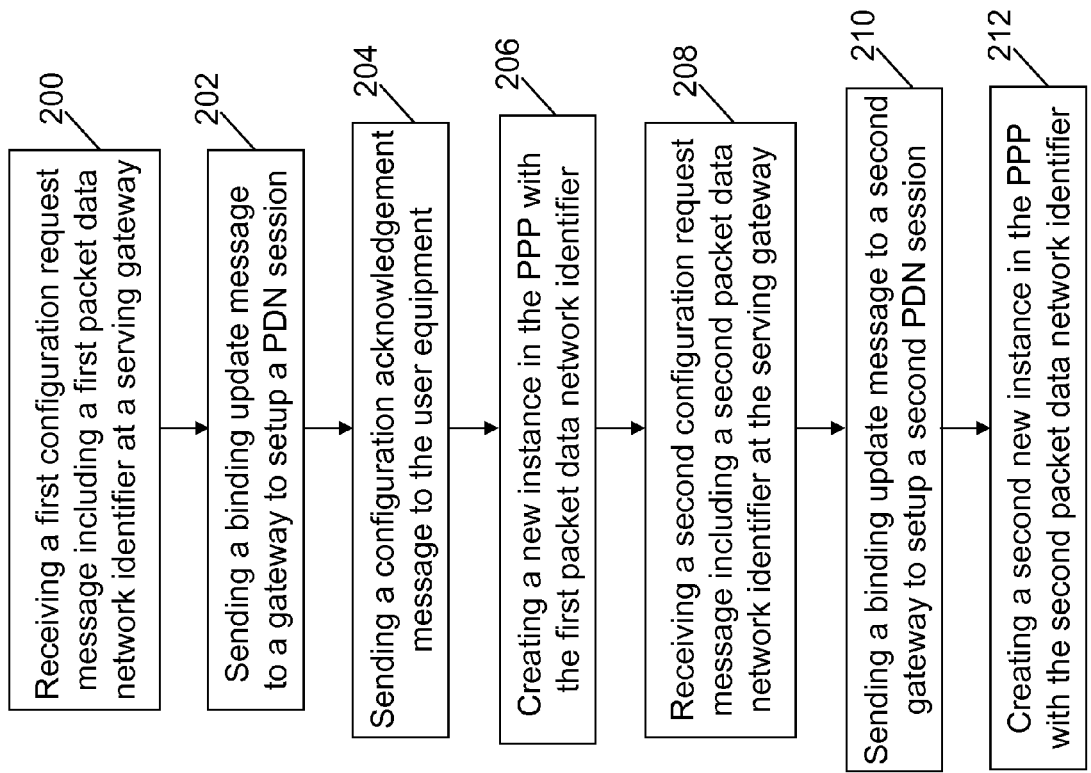
FIG. 6 illustrates a diagram detailing setup of multiple PDN sessions in accordance with certain embodiments.

FIG. 6 illustrates a diagram detailing setup of multiple PDN sessions in accordance with certain embodiments. In step 200, a serving gateway receives a first configuration request message including a first packet data network identifier (PDN-ID). The configuration request message can be implemented in VSNCP and can include an APN, a PDN address allocation, a PCO, a PDN-ID, and an attach type. In step 202, a binding update message is sent to a PDN gateway to setup a PDN session. The binding update message can be sent using proxy mobile IP (PMIP). A configuration acknowledgement message is sent to the user equipment (UE) in step 204. In step 206, a new instance is created in the PPP with the first PDN. The new instance can be a VSNCP instance in the PPP. In step 208, a second configuration request message including a second PDN-ID is received at the serving gateway such as a HSGW. In step 210, a binding update message is sent from the serving gateway to a P-GW to setup a second PDN session. In step 212, a new instance in the PPP is created with the second PDN-ID.

Figure 7:
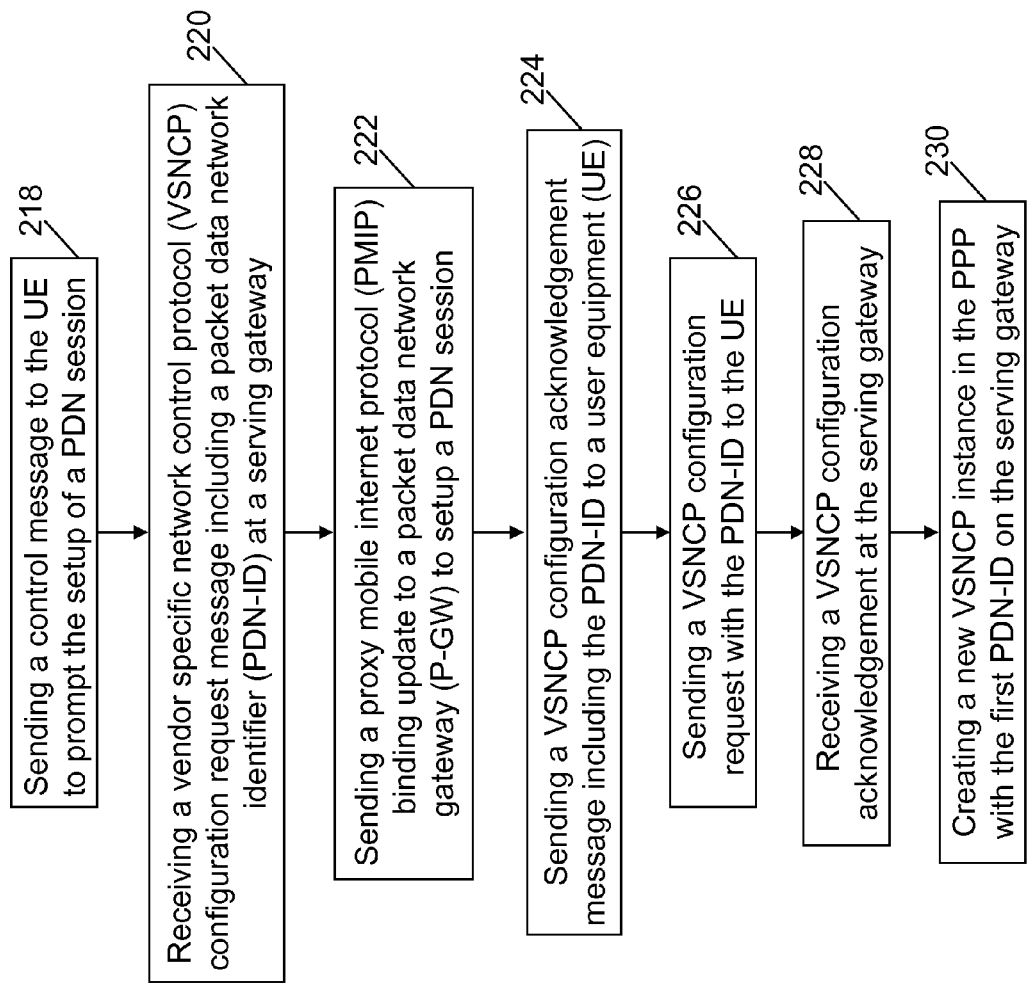
FIG. 7 illustrates a diagram detailing setup of a PDN session in accordance with certain embodiments.

FIG. 7 illustrates a diagram detailing setup of a PDN session in accordance with certain embodiments. In step 218, a network device such as a HSGW sends a control message to the UE to prompt the UE to initiate the setup of a PDN session. The control message can be a network control message which can include network information such as the device requesting the session and IP address information regarding the requested PDN session. This can prompt the UE to select an PDN-ID and initiate a PDN connectivity. In step 220, a serving gateway such as a HSGW receives a VSNCP configuration request message including a PDN-ID and other fields such as an APN, a PDN address allocation, a PCO, and an attach type. In step 222, a PMIP binding update is sent to a P-GW to setup the PDN session. In step 224, a VSNCP configuration acknowledgement message including the PDN-ID is sent to the UE. In step 226, a VSNCP configuration request with the PDN-ID is sent to the UE. In step 228, a VSNCP configuration acknowledgement is received at the serving gateway. The serving gateway creates a new VSNCP instance in the PPP with the first PDN-ID in step 230.

Figure 8:
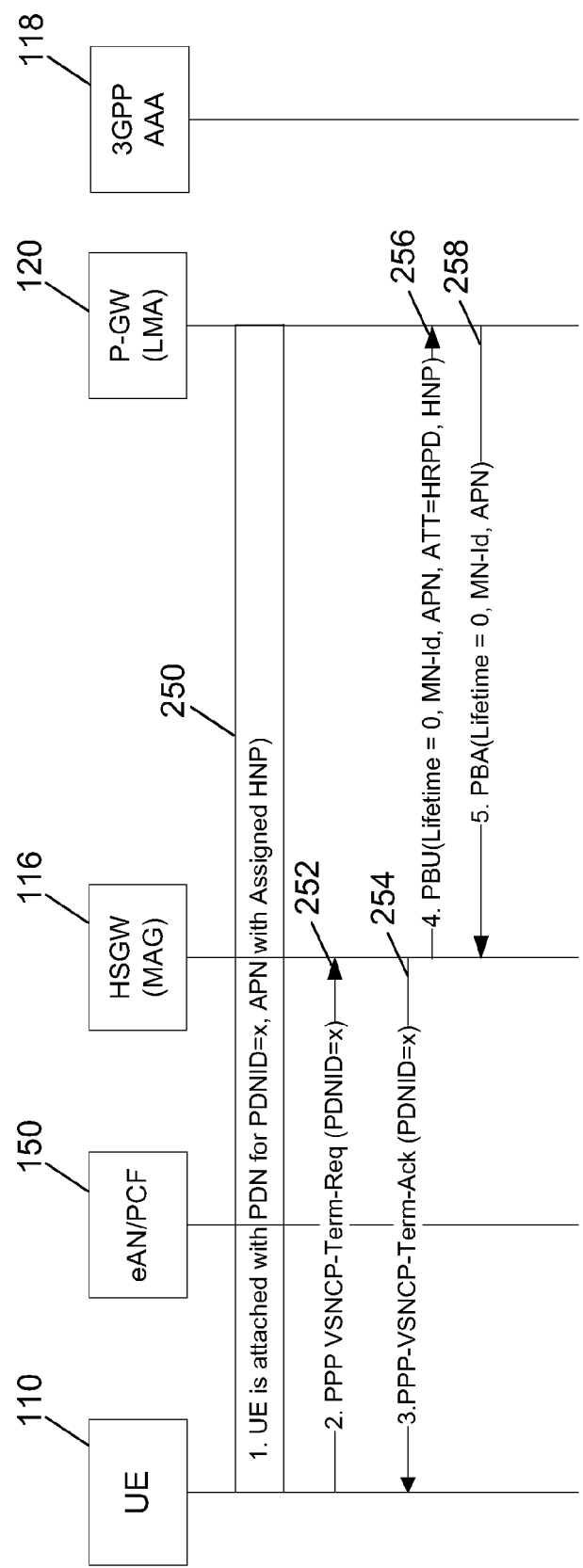
FIG. 8 illustrates a PDN connection release initiated by a UE in accordance with certain embodiments.

As mentioned above, a PDN connection can be updated and terminated as well. FIG. 8 illustrates a PDN connection release initiated by a UE in accordance with certain embodiments. In 250, the UE 110 is attached to the EPC and has a PDN with the P-GW 120 for PDN-ID=x and an APN with an assigned home network prefix (HNP). When a disconnection of the PDN is initiated, the UE sends a PPP VSNCP-Term-Req 252 with PDN-ID=x to disconnect the PDN identified by x. The HSGW 116, which may also be a mobility access gateway (MAG), starts disconnecting the PDN connection and sends a PPP-VSNCP-Term-Ack 254 to the UE 110. The HSGW 116 starts tearing down the PMIP session with the P-GW 120, which may also be a local mobility anchor (LMA), by sending a proxy binding update (PBU) deregistration message (Dereg) 256 to P-GW 120. The deregistration message 256 can include a lifetime=0 to initiate the teardown, the APN, the HNP, and the ATT=HRPD. The P-GW 120 looks up the binding cache entry (BCE) and deletes the binding and responds back to the HSGW 116 with a Dereg proxy binding acknowledgement (PBA) 258.

Figure 9:
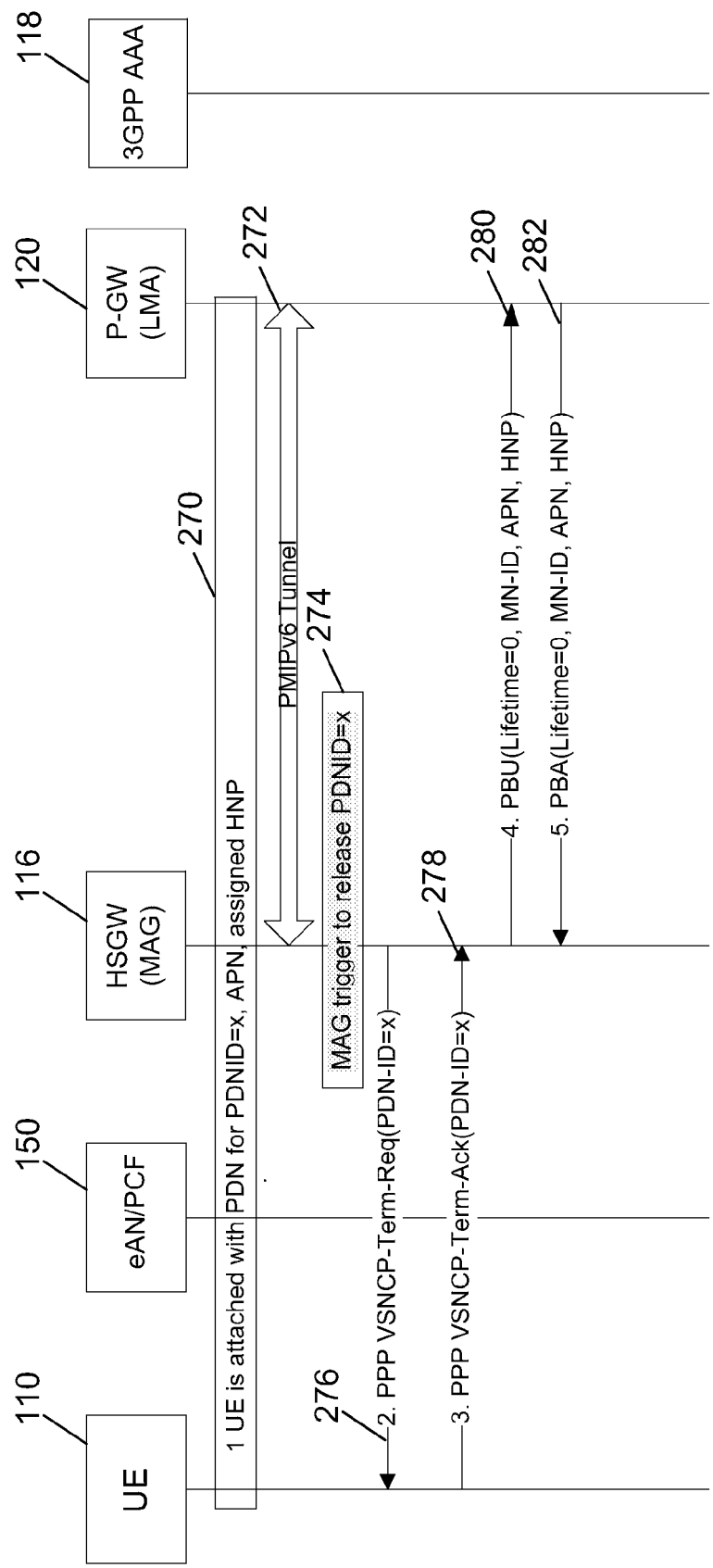
FIG. 9 illustrates a PDN connection release initiated by the network in accordance with certain embodiments.

FIG. 9 illustrates a PDN connection release initiated by the network in accordance with certain embodiments. In 270, the UE 110 is attached to the EPC and has a PDN connection with the P-GW 120 for PDN-ID=x. A PMIPv6 tunnel 272 is established between HSGW 116 and P-GW 120 to provide communication of packets between the devices. The HSGW 116 trigger to release the PDN-ID=x in 274 initiates the disconnect of the PDN connection for PDN-ID=x, and HSGW sends a PPP VSNCP-Term-Req message 276 with the PDN-ID to the UE 110. The UE acknowledges the receipt of PPP VSNCP-Term-Req with a VSNCP-Term-Ack message 278 and includes the PDN-ID to specify the PDN connection to the HSGW. The HSGW 116 starts tearing down the PMIP session with P-GW 120 by sending a PBU Dereg message 280 to the P-GW 120 with a lifetime=0, the APN, and the HNP. The P-GW 120 looks up the BCE, deletes the binding, and responds back to the HSGW 116 with a Dereg PBA message 282.

The HSGW and the P-GW described above are implemented in a chassis in some embodiments. This chassis can implement multiple and different integrated functionalities. In some embodiments, a mobility management entity (MME), a serving gateway (SGW), a PDN gateway (P-GW), an access gateway, a packet data serving node (PDSN), a foreign agent (FA), or home agent (HA) can be implemented on a chassis. Other types of functionalities can also be implemented on a chassis in other embodiments are a Gateway General packet radio service Serving Node (GGSN), a serving GPRS support node (SGSN), a packet data inter-working function (PDIF), an access service network gateway (AS-NGW), a base station, a access network, a User Plane Entity (UPE), an IP Gateway, an access gateway, a session initiation protocol (SIP) server, a proxy-call session control function (P-CSCF), and an interrogating-call session control function (I-CSCF), a serving gateway (SGW), and a packet data network gateway (PDN GW). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. In certain embodiments, a chassis is provided by Starent Networks, Corp. of Tewksbury, Mass. in a ST16 or a ST40 multimedia platform.

Figure 10:
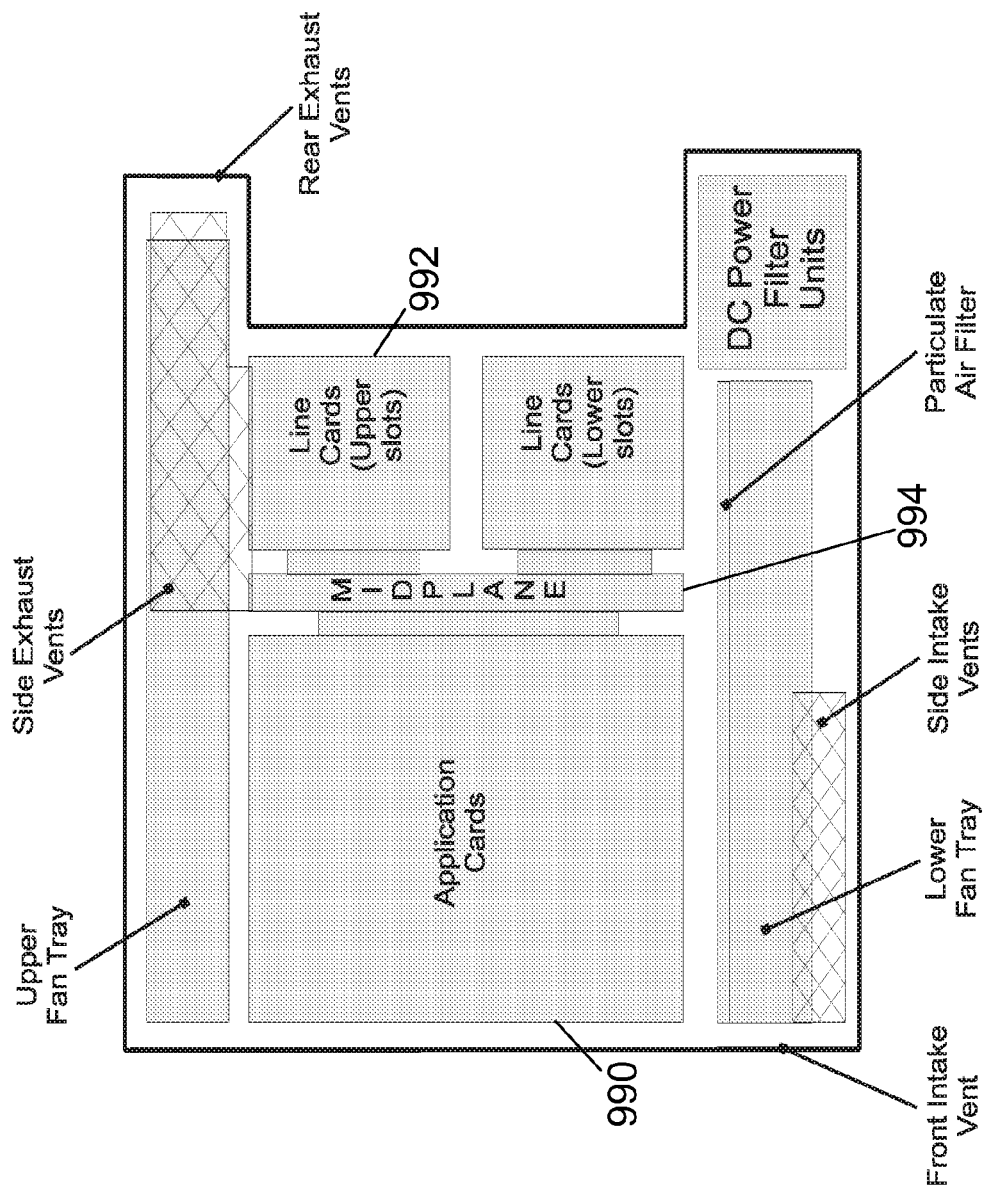
FIG. 10 illustrates a chassis in accordance with certain embodiments.

The features of a chassis that implements a gateway, in accordance with some embodiments, are further described below. FIG. 10 illustrates positioning of cards in the chassis in accordance with some embodiments. The chassis includes slots for loading application cards 990 and line cards 992. A midplane 994 can be used in the chassis to provide intra-chassis communications, power connections, and transport paths between the various installed cards. The midplane 994 can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least two types of application cards: a switch processor card and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

In some embodiments, a ST40 embodiment of the chassis can support a system management card (SMC) and a packet services card (PSC). The system management card is a system control and management card for managing and controlling other cards in the chassis. The packet services card is a high-speed processing card that provides multi-threaded point-to-point, packet data processing, and context processing capabilities, among other things.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

We claim:

1. A method of communicating with multiple gateways comprising:
   receiving a first point to point protocol (PPP) configuration request message including a first packet data network ID (PDN-ID) and access point name (APN) information at a serving gateway;
   setting up a connection from the serving gateway to a first packet data network gateway (PGW), thereby setting up a first PDN session;
   sending a first PPP configuration acknowledgement message including a first PDN-ID;
   creating a first new instance in the PPP with the first PDN-ID;
   subsequent to creating the first new instance, receiving a second PPP configuration request message including a second PDN-ID at the serving gateway;
   setting up a second PDN session; and
   creating a second new instance in the PPP with the second PDN-ID,
   thereby providing two PDN sessions that are simultaneously available at the serving gateway beyond a handover phase.

2. The method of claim 1, further comprising receiving a configuration change with the first PDN-ID to direct changes to the first PDN session.

3. The method of claim 1, further comprising setting up a connection from the serving gateway to a second packet data network gateway (PGW).

4. The method of claim 1, wherein the serving gateway is a high rate packet data (HRPD) serving gateway (HSGW) and the PPP configuration request message is a network control protocol message.

5. The method of claim 4, wherein the network control protocol message is a vendor-specific network control protocol (VSNCP) message.

6. The method of claim 1, further comprising sending a network control message to user equipment (UE) to initiate PDN connectivity.

7. The method of claim 1, wherein the setting up a connection comprises sending a proxy mobile IP (PMIP) binding update to the PGW.

8. The method of claim 1, further comprising assigning a first IP address to the first PDN session and assigning a second IP address to the second PDN session.

9. A serving gateway in a communication network comprising:
   a first interface which is configured to receive a first network configuration protocol (NCP) configuration request message including a first packet data network ID (PDN-ID) and a second PPP configuration request message including a second PDN-ID;
   the serving gateway configured to establish a first PDN connection that is associated with the first PDN-ID with a first packet data network gateway (PGW) and to subsequently establish a second PDN connection that is associated with the second PDN-ID; and
   a computer readable medium that stores a first NCP instance created for the first PDN connection and a second NCP instance created for the second PDN-ID,
   the serving gateway thereby configured to provide two PDN sessions that are simultaneously available at the serving gateway beyond a handover phase.

10. The serving gateway of claim 9, further comprising the first interface configured to receive a configuration change with a first PDN-ID to direct changes to a first PDN session.

11. The serving gateway of claim 9, wherein the serving gateway is a high rate packet data (HRPD) serving gateway (HSGW) and the PPP configuration request message is a network control protocol message.

12. The serving gateway of claim 11, wherein the network control protocol message is a vendor-specific network control protocol (VSNCP) message.

13. The serving gateway of claim 9, wherein the serving gateway is configured to send a network control message to a user equipment (UE) to initiate PDN connectivity.

14. The serving gateway of claim 9, wherein the serving gateway is configured to send a proxy mobile IP (PMIP) binding update to the PGW to establish the first connection and the second connection.

15. The serving gateway of claim 9, wherein the serving gateway is configured to assign a first IP address to the first PDN session and assigning a second IP address to the second PDN session in the computer readable medium.

16. A method of communicating with multiple gateways comprising:
   sending a first network control protocol (NCP) configuration request message including a first packet data network ID (PDN-ID) and address information to a serving gateway to setup a first packet date network (PDN) session connection;
   receiving a first NCP configuration acknowledgement message including a first PDN-ID;
   establishing the first PDN session connection with the first PDN-ID;
   subsequent to establishing the first PDN session connection, sending a second NCP configuration request message including a second PDN-ID to the serving gateway to setup a second PDN session connection; and
   establishing the second PDN session with second PDN-ID,
   thereby providing two PDN sessions that are simultaneously available at the serving gateway beyond a handover phase.

17. The method of claim 16, further comprising sending a configuration change with a first PDN-ID to direct changes to the first PDN session.

18. The method of claim 16, wherein the serving gateway is a HPRD serving gateway (HSGW) and the PPP configuration request message is a vendor-specific network control protocol (VSNCP) message.

* * * * *